(12) United States Patent
Ahn et al.

(10) Patent No.: US 7,716,693 B2
(45) Date of Patent: May 11, 2010

(54) OPTICAL DISC DRIVE WITH STATIC ELECTRICITY

(75) Inventors: Cheol-woong Ahn, Seoul (KR); Hag-ryeol Kim, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 1468 days.

(21) Appl. No.: 11/071,330

(22) Filed: Mar. 4, 2005

(65) Prior Publication Data
US 2005/0198659 A1    Sep. 8, 2005

(30) Foreign Application Priority Data
Mar. 4, 2004    (KR) .................... 10-2004-0014588

(51) Int. Cl.
*G11B 33/14* (2006.01)
(52) U.S. Cl. ...................................... 720/650; 720/601
(58) Field of Classification Search ......... 720/601–616, 720/650, 652–655
See application file for complete search history.

(56) References Cited

U.S. PATENT DOCUMENTS

| | | | |
|---|---|---|---|
| 5,063,474 A * | 11/1991 | Igarashi ...................... | 361/220 |
| 5,684,775 A | 11/1997 | Tanaka et al. | |
| 6,341,115 B1 * | 1/2002 | Otani et al. ................. | 720/653 |
| 6,392,975 B2 * | 5/2002 | Arai ............................ | 720/610 |
| 6,603,723 B2 | 8/2003 | Minase | |
| 7,363,637 B2 * | 4/2008 | Peng .......................... | 720/650 |
| 2004/0111732 A1 * | 6/2004 | Park et al. ................... | 720/650 |
| 2004/0163094 A1 * | 8/2004 | Matsui et al. ............... | 720/650 |

FOREIGN PATENT DOCUMENTS

| | | | |
|---|---|---|---|
| JP | 04-325985 | | 11/1992 |
| JP | 08221967 A | * | 8/1996 |
| JP | 2000-011559 | | 1/2000 |
| JP | 2002-050103 | | 2/2002 |
| JP | 2002-050162 | | 2/2002 |

* cited by examiner

*Primary Examiner*—William J Klimowicz
*Assistant Examiner*—Carlos E Garcia
(74) *Attorney, Agent, or Firm*—Staas & Halsey LLP

(57) ABSTRACT

An optical disc drive includes a chassis assembly formed of metal and grounded, a tray supporting an optical disc and installed capable of sliding in and out of the chassis assembly, a cover-deck formed of metal and attached on a lower surface of the tray, an eject switch provided on a front surface of the tray to unlock the tray which is inserted in the chassis assembly and locked therein, an eject button provided in front of the tray to press the eject switch, a bracket formed of metal, provided between the eject switch and the eject button, and having a lead formed at one end portion thereof and contacting the cover-deck, and a static electricity discharge wire electrically connecting the cover-deck and the chassis assembly, wherein static electricity generated when the eject button is pressed sequentially flows through the bracket, the cover-deck, and the chassis assembly, and flows out to ground.

18 Claims, 5 Drawing Sheets

US 7,716,693 B2

OPTICAL DISC DRIVE WITH STATIC ELECTRICITY

CROSS-REFERENCE TO RELATED APPLICATION

This application claims the priority of Korean Patent Application No. 2004-14588, filed on Mar. 4, 2004 in the Korean Intellectual Property Office, the disclosure of which is incorporated herein in its entirety by reference.

BACKGROUND OF THE INVENTION

1. Field of the Invention

The present invention relates to an optical disc drive, and more particularly, to an optical disc drive which can prevent damage by static electricity not only in a closed state of a tray but also in an open state thereof.

2. Description of the Related Art

In general, optical disc drives record or reproduces information by radiating light onto a recording medium such as CDs (compact discs) and DVDs (digital versatile discs). The optical disc drive includes various structures to discharge static electricity to prevent malfunction or failure of elements due to the static electricity.

FIGS. 1 and 2 show an example of a static electricity discharge structure employed in a conventional optical disc drive. FIG. 1 shows that a tray 30 of the conventional optical disc drive is closed while FIG. 2 shows that the tray 30 is open. The optical disc drive is disclosed in U.S. Pat. No. 5,684,775.

Referring to FIG. 1, the conventional optical disc drive includes a chassis 33 formed of metal, the tray 30 coupled to the chassis 33 to be inserted into the chassis 33 or pulled out of the chassis 33 by being guided by a guide rail 42, and a bezel 35 provided at a front side of the tray 30. An eject button 43 to unlock the tray 30 when inserted in the chassis 33 and locked is provided at the bezel 35. An eject switch 52, which is pressed by the eject button 43, and a circuit board 50, where the eject switch 52 is installed, are provided at a front surface portion of the tray 30 facing the eject button 43. A metal plate member 60 to guide current by static electricity toward the chassis 33 is provided at a rear surface of the bezel 35 facing the front surface portion of the tray 30. The metal plate member 60 is attached to the rear surface of the bezel 35 by a pair of bosses 36 and 37 protruding from the rear surface of the bezel 35.

In a state in which the tray 30 of the optical disc drive having the above structure is inserted in the chassis 33, when the eject button 43 is pressed using a finger tip 17 to open the optical disc drive, as shown in FIG. 1, a discharge of static electricity 80 may be generated by friction between the finger tip 17 and the eject button 43. The static electricity 80 passes through a gap 70 between the bezel 35 and the eject button 43, as indicated by an arrow shown in FIG. 1, to proceed toward a cover portion 61 of the metal plate member 60 located around the eject switch 52. Then, the static electricity 80 is transferred to the chassis 33 via contact leads 64 and 65 at both ends of the metal plate member 60 and discharged through a ground (not shown). Thus, the static electricity 80 is prevented from flowing into the circuit board 50 via the eject switch 52.

However, referring to FIG. 2, when the optical disc drive is in an open state as the tray 30 is pulled out of the chassis 33, since the contact leads 64 and 65 of the metal plate member 60 do not contact the chassis 33, a discharge path of the static electricity is blocked so that the static electricity may flow into the circuit board 50 to malfunction or damage the optical disc drive.

SUMMARY OF THE INVENTION

Additional aspects and/or advantages of the invention will be set forth in part in the description which follows and, in part, will be obvious from the description, or may be learned by practice of the invention.

To solve the above and/or other problems, an aspect of the present invention provides an optical disc drive in which a discharge path of static electricity is maintained when a tray is pulled out and in an open state.

According to an aspect of the present invention, an optical disc drive comprising a chassis assembly formed of metal and grounded, a tray supporting an optical disc and installed capable of sliding in and out of the chassis assembly, a cover-deck formed of metal and attached on a lower surface of the tray, an eject switch provided on a front surface of the tray to unlock the tray which is inserted in the chassis assembly and locked therein, an eject button provided in front of the tray to press the eject switch, a bracket formed of metal, provided between the eject switch and the eject button, and having a lead formed at one end portion thereof and contacting the cover-deck, and a static electricity discharge wire electrically connecting the cover-deck and the chassis assembly, wherein static electricity generated when the eject button is pressed sequentially flows through the bracket, the cover-deck, and the chassis assembly, and flows out to ground.

According to an aspect of the invention, the bracket has an opening at a central portion of a front surface of the eject switch and a flange portion protruding forward around an edge of the opening. The bracket is attached to the front surface of the tray.

According to an aspect of the invention, the cover-deck and a lead at one end portion of the static electricity discharge wire are coupled using a bolt so as to be conductively connected.

According to an aspect of the invention, the chassis assembly and a lead at the other end portion of the static electricity discharge wire are coupled using a bolt so as to be conductively connected.

According to an aspect of the invention, the static electricity discharge wire is a predetermined circuit pattern formed in a printed circuit.

According to an aspect of the invention, the printed circuit is made of flexible material.

BRIEF DESCRIPTION OF THE DRAWINGS

The above and/or other aspects and advantages of the present invention will become more apparent and more readily appreciated by describing in detail embodiments thereof with reference to the accompanying drawings in which:

FIGS. 1 and 2 are views illustrating a static electricity discharge structure employed in the conventional optical disc drive, in which FIG. 1 shows a state in which a tray is closed while FIG. 2 shows a state in which the tray is open;

FIGS. 4 and 5 are cross-sectional views of the optical disc drive of FIG. 3, in which FIG. 4 shows a tray is closed while FIG. 5 shows the tray is open;

DETAILED DESCRIPTION OF THE EMBODIMENTS

Figure 1:
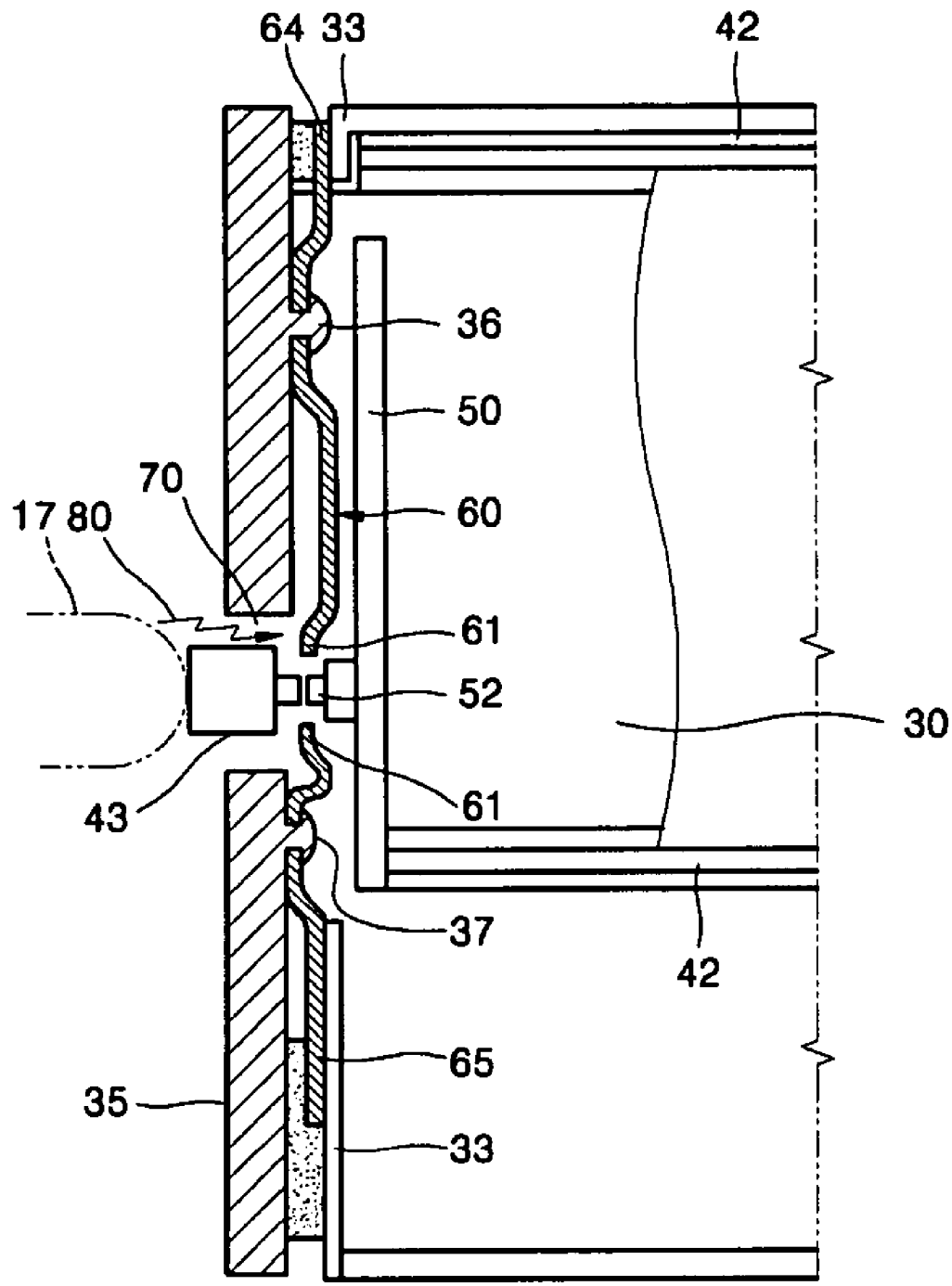
Figure 2:
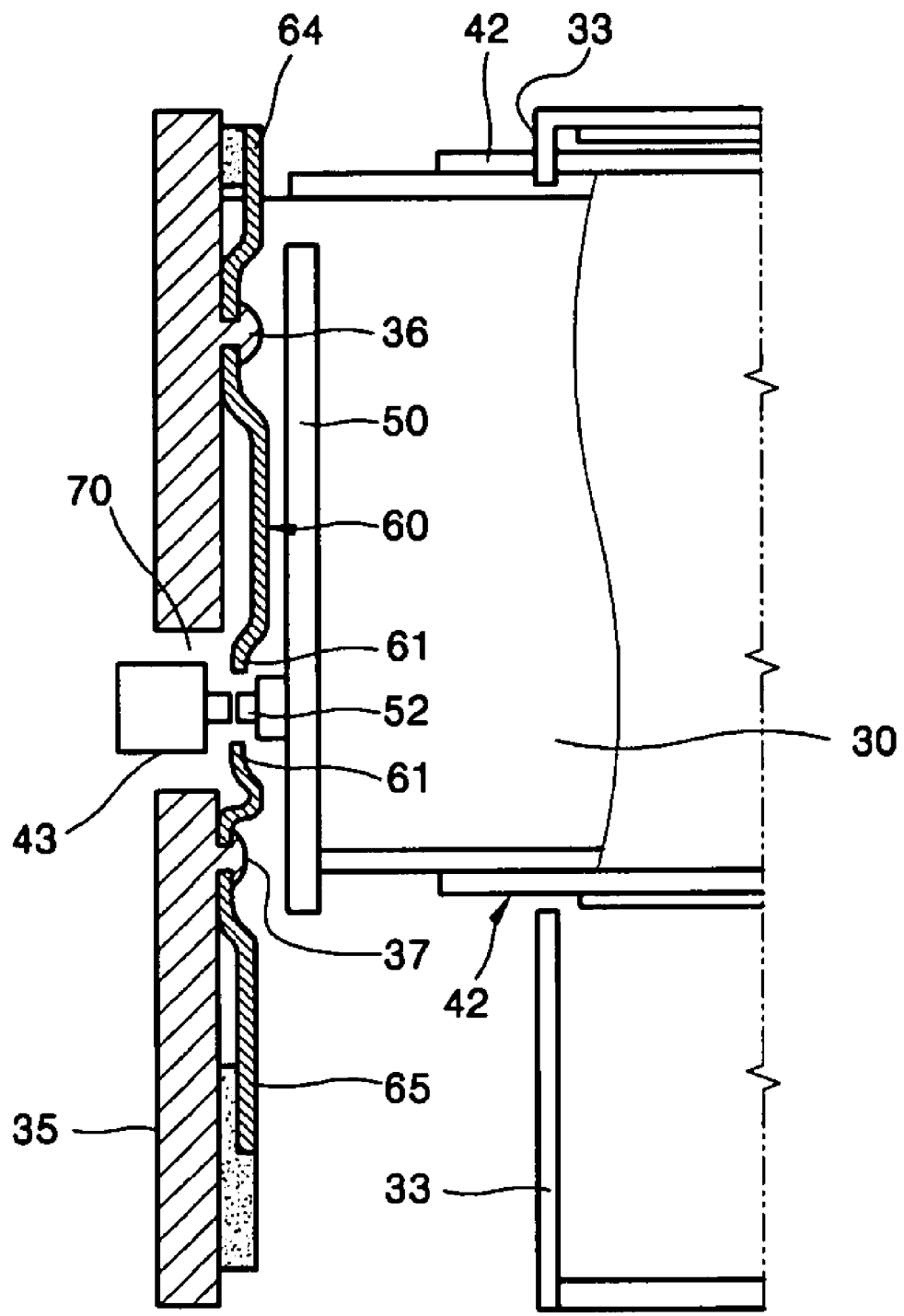

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIGS. 3 through 7, an optical disc drive 100 according to an aspect of the present invention is a optical disc drive and includes a chassis assembly structure and a tray 110. The chassis assembly structure is formed by coupling upper and lower chassis 105 and 101, made of metal and has an inner space with one open side. The tray 110 is installed at the lower chassis 101 to be capable of sliding in and out of the inner space of the chassis assembly structure. A main base 120 is coupled to the tray 110. A spindle motor 122 to rotate an optical disc D, an optical pickup device 125 to record or reproduce information with respect to the optical disc D by radiating light onto the optical disc D while sliding in a radial direction of the optical disc D that is rotating, and a driving motor to reciprocate the optical pickup device 125 in the radial direction of the optical disc D, are installed on the main base 120. The main base 120, together with the spindle motor 122, the optical pickup device 125, and the driving motor 127, which are installed on the main base 120, slides in and out of the chassis assembly structure. While shown as a thin and slim optical disc drive, it is understood that the present invention can be used in other types of drives.

Figure 3:
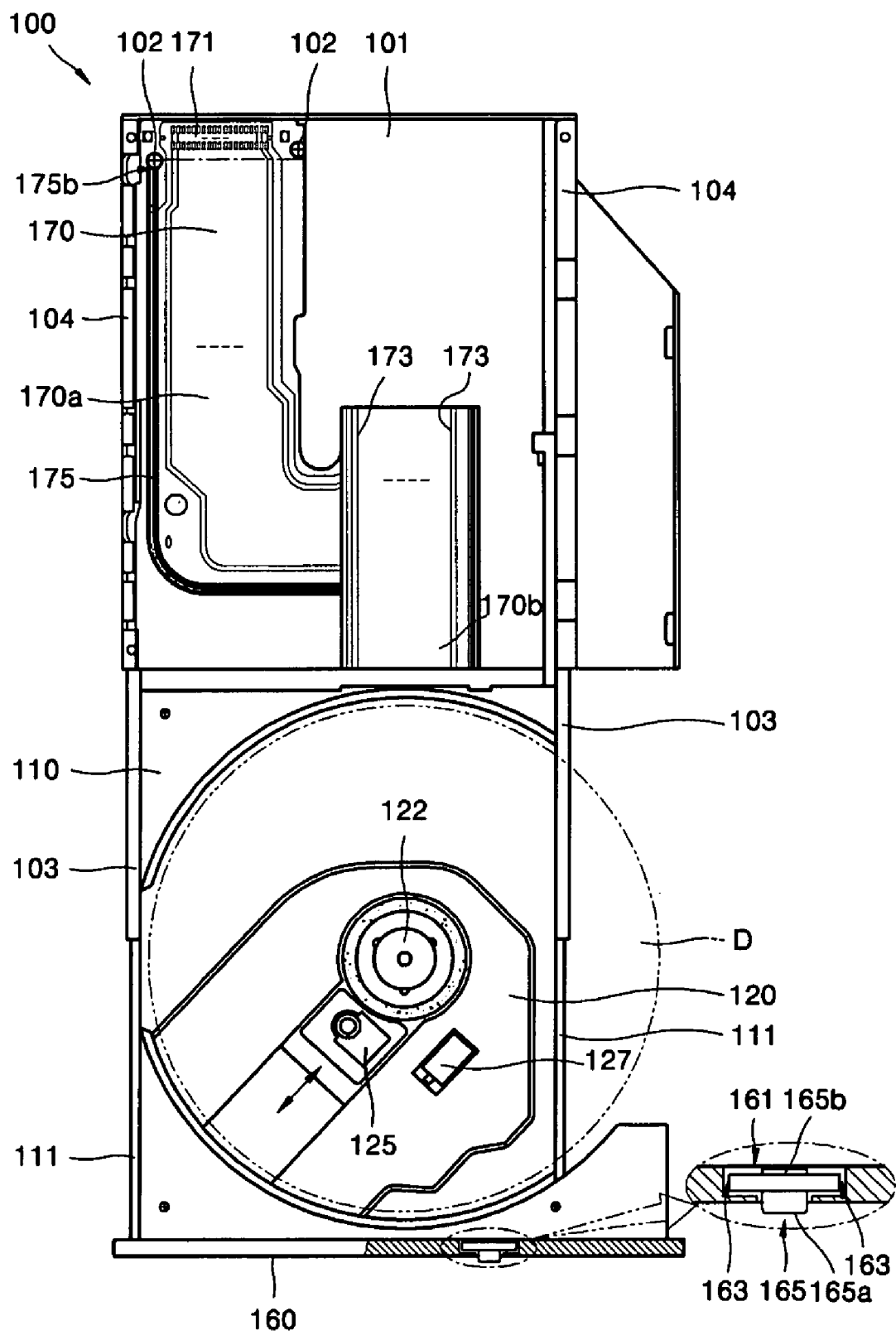
FIG. 3 is a plan view illustrating an optical disc drive according to an aspect of the present invention.

Referring to FIG. 3, a tray guide apparatus to guide sliding in and out of the tray 110 is provided at the optical disc drive 100. The tray guide apparatus comprises a rail coupling portion 111 formed at both side ends of the tray 110, a sliding rail 103 coupled to the rail coupling portion 111 to be capable of sliding, and a rail guide 104 fixed on inner surfaces of both sides of the lower chassis 101 to support sliding of the sliding rail 103 according to an aspect of the present invention. However, it is understood that other types of guide apparatuses can be used, and that the main base 120, Spindle motor 122, the pickup device 125, and/or the driving motor 127 need not all be included on the tray 110 in all aspects of the invention.

Figure 4:
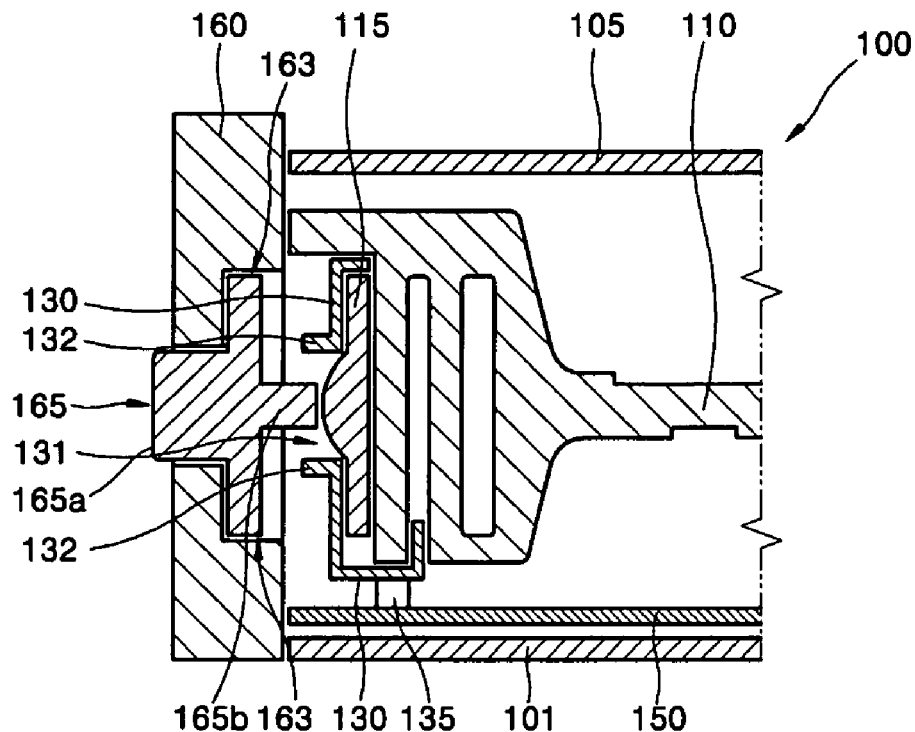

A cover-deck 150 is attached on the bottom surface of the tray 110 as shown in FIG. 4. The cover-deck 150 may be formed of metal. The cover-deck 150, together with the main base 120, is coupled to the tray 110 using a bolt (not shown). The main base 120 is coupled to the tray 110 and the spindle motor 122, the optical pickup device 125, and the driving motor 127, which are installed on the main base 120 to protect them as shown in FIG. 3.

Figure 7:
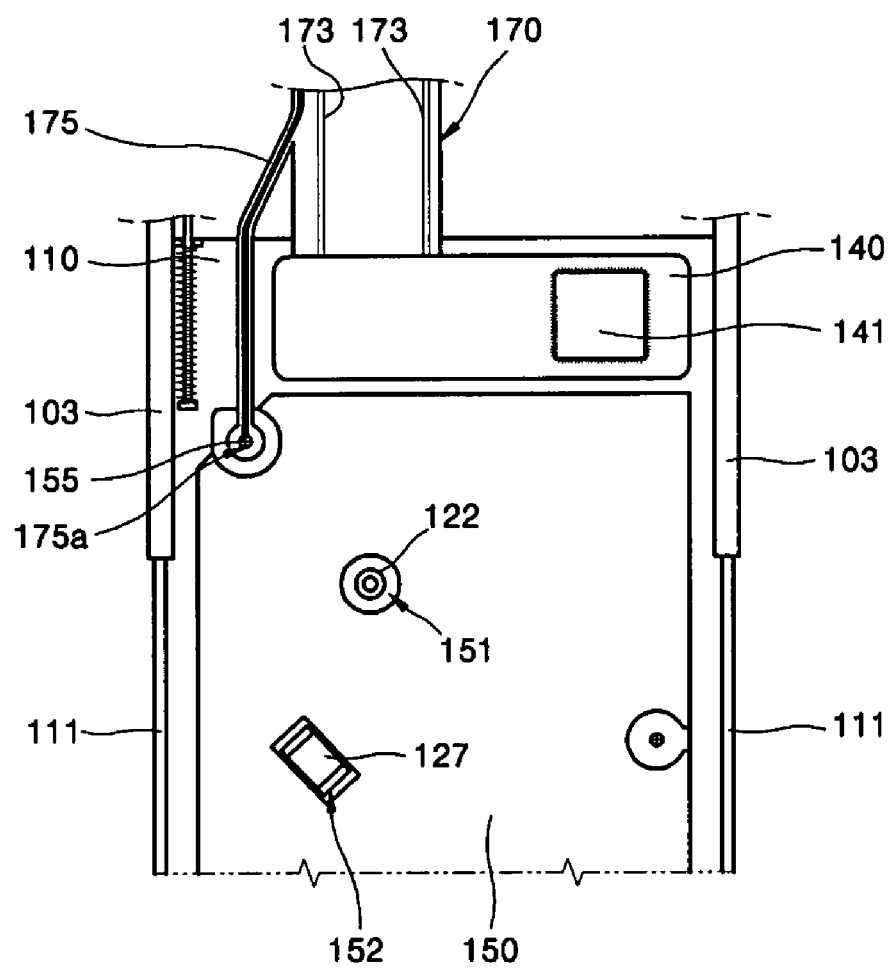
FIG. 7 is a view illustrating part of a bottom surface of the tray shown in FIG. 3.

Openings 151 and 152 to dissipate heat generated by the spindle motor 122 and the driving motor 127 are formed in the cover-deck 150, as shown in FIG. 7.

Referring to FIG. 7, a main circuit board 140 where a CPU 141 is mounted is attached on the bottom surface of the tray 110 to control the spindle motor 122, the optical pickup device 125 (not shown in FIG. 7,) and the driving motor 127 of the optical disc drive 100. The main circuit board 140 is connected to the above motor 122, pick up device 125 and motor 127 by a predetermined circuit and interfaced with external devices such as a computer via a flexible printed circuit 170. Thus, an interface connector 171 for connection to the external devices is provided at one end of the flexible printed circuit 170 and a connector (not shown) for connection to the main circuit board 140 is provided at the other end thereof. A control signal output from the external devices is input via the interface connecter 171 and transferred to the main circuit board 140 through a circuit pattern of the flexible printed circuit 170. An interface connector portion of the flexible printed circuit 170 is attached to the lower chassis 101 using an adhesive while the opposite portion is separated from the lower chassis 101 so as to be able to move with the tray 110.

In FIG. 3, reference numeral 170a denotes the portion of the flexible printed circuit 170 attached to the lower chassis 101 and reference numeral 170b denotes the movable portion thereof.

A bezel 160 is attached to a front surface of the tray 110. When the optical disc drive 100 is installed at an external device such as a computer, only the bezel 160 is exposed to the outside unless the tray 110 is open. An eject button 165 is provided on the bezel 160 and to unlock the tray 110 in a closed state by being pushed. The eject button 165 is inserted in a through hole formed in the bezel 160 and protrudes to the front side of the bezel 160 as a front end portion 165a of the eject button 165 is appropriately elastically biased by an elastic member (not shown) such as a spring. Thus, when the front end portion 165a of the eject button 165 is pressed, a rear end portion 165b of the eject button 165 protrudes backward and presses an eject switch 115 which is described later. When the pressing of the eject button 165 is released, the eject button 165 is returned to the original position by an elastic force of the elastic member so that the pressing of the eject switch 115 is released.

Figure 5:
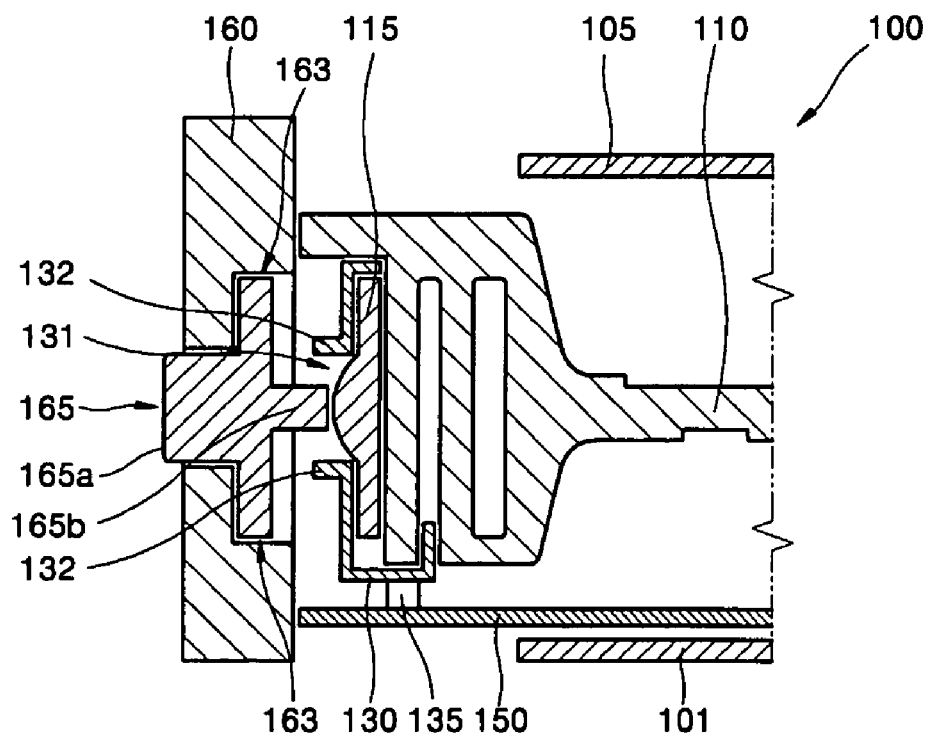

Referring to FIGS. 4 and 5, the eject switch 115 is attached on the front surface of the tray 110 to be slightly separated from the rear end portion 165b of the eject button 165. The eject switch 115 is mounted on a predetermined circuit board (not shown) and the circuit board is electrically connected to a locking apparatus (not shown) to maintain the tray closed position. The eject button 165 and eject switch 115 may be formed integrally in a body.

Thus, when a user presses the eject button 165 in a state in which the tray 110 is disposed in the chassis assembly structure, (that is, in a closed state,) the rear end portion 165b presses the eject switch 115 and an unlocking signal is transmitted to the locking apparatus so that the tray 110 and the bezel 160 protrude a predetermined width from the chassis assembly structure. Then, the user pulls the tray 110 that is unlocked and the bezel 160 using a hand and places the optical disc D on the tray 110 or removes the optical disc D from the tray 110.

The structure to discharge static electricity that is an aspect of the present invention is described in detail.

Figure 6:
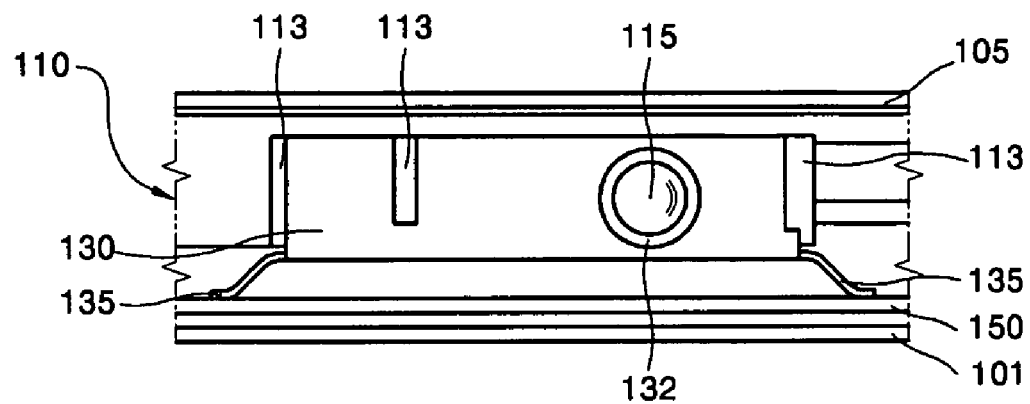
FIG. 6 is a view illustrating part of a front surface of the tray shown in FIG. 3.

To discharge static electricity, the optical disc drive 100 includes a bracket 130 which is formed of metal and provided between the eject switch 115 and the eject button 165. It is also understandable that the bracket 130 is formed of any conductible material. The bracket 130, as shown in FIG. 6, is fixedly installed not to separate from the front surface portion of the tray 110 by ribs 113 formed on the front surface portion of the tray 110. As shown in FIGS. 4 and 5, an opening 131 is formed not to prevent contact between the eject switch 115 and the rear end portion 165b of the eject button 165, and a flange portion 132 protrudes forward at an edge of the opening 131. Since the flange portion 132 protrudes forward more than the eject switch 115, the flange portion 132 induces static electricity like a lighting rod. Also, a lead 135 is provided at an end portion of a lower portion of the bracket 130 bent backward so as to contact the cover-deck 150. Although not shown, a spacer formed of an insulating member is provided between the eject switch 115 and the bracket 130 such that the eject switch 115 can be separated a predetermined distance from the bracket 130, not contacting the same. However, it is understood that the spacer is not required in all aspects of the invention.

The cover-deck 150 and the lower chassis 101 are electrically connected by a static electricity discharge wire. In the present embodiment, the static electricity discharge wire is a predetermined circuit pattern 175 to discharge static electricity which is formed in the flexible printed circuit 170 not to interfere with circuit patterns 173 to connect the main circuit board 140 and the interface connector 171. However, the static electricity discharge wire in the present invention is not limited to the above-described form shown in FIG. 3 or FIG. 7, but may be an additional flexible printed circuit separated from the flexible printed circuit 170 or an insulation coated copper wire.

In the static electricity discharge wire 175 employed in the optical disc drive 100 according to an aspect of the present invention, a lead 175a at one end portion thereof is coupled to a corner portion of the cover-deck 150 using a bolt 155. The bolt 155 makes the cover-deck 150 be attached to the tray 110 and simultaneously the lead 175a at one end portion of the predetermined circuit pattern 175 and the cover-deck 150 closely contact each other, so that the cover-deck 150 and the predetermined circuit pattern 175 are connected conductively. A lead 175b at the other end portion of the predetermined circuit pattern 175, as shown in FIG. 3, is coupled to the lower chassis 101 using a bolt 102. The bolt 102 makes the interface connector 171 be attached to the lower chassis 101 and simultaneously the lead 175b at the other end portion of the static electricity discharge wire 175 and the lower chassis 101 closely contact each other, so that the lower chassis 101 and the pattern 175 are connected conductively. It is understood that the bolt 102 represents only one mechanism by which the leads 175a and 175b are connected, and that other types of connections can be made.

As shown in FIG. 4, when the eject button 165 is pressed by a finger tip to unlock the tray 110 of the optical disc drive 100 in a closed state, discharge of static electricity may be generated by frictional charge between the eject button 165 and the finger tip. The static electricity passes through a gap 163 between the eject button 165 and a bezel through hole 161 and is guided toward the bracket 130 disposed in front of the eject switch 115. Since the flange portion 132 protruding forward is provided on the bracket 130, the static electricity may be more easily guided to flow toward the flange portion 132. The static electricity guided toward the bracket 130 sequentially flows in the cover-deck 150 connected to the lead 135 of the bracket 130, the pattern 175 connected to the cover-deck 150, and the lower chassis 101 connected to the pattern 175, and is finally discharged by being grounded. It is also understandable that the cover-deck 150 can be directly connected to the bracket 130.

Since the cover-deck 150 is fixed to the tray 110, as shown in FIG. 5, the lead 135 of the bracket 130 continuously contacts the cover-deck 150 in the open state of the tray 110. Thus, even when the static electricity is discharged by pressing the eject button 165 in this state, the static electricity can be discharged along the same path as in the closed state of the tray 110.

Accordingly, not only in the close state but also in the open state, the eject button 115, the spindle motor 122, the optical pickup device 125, the driving motor 127, and the CPU 141 may not be damaged by the static electricity. While shown as using an eject button, it is understood that other mechanisms can be used to access the eject switch, and that the eject button need not be used in all aspects of the invention.

As described above, in the optical disc drive according to the present invention, in either of the close and open states, since the static electricity can be discharged by being grounded without passing through the eject button, the spindle motor, the optical pickup device, the driving motor, and the CPU, damage to the optical disc drive by the static electricity can be prevented.

While embodiments of the invention have been particularly shown and described with reference to preferred embodiments thereof, it will be understood by those skilled in the art that various changes in form and details may be made therein without departing from the spirit and scope of the invention as defined by the accompanying claims and equivalents thereof.

What is claimed is:

1. An optical disc drive comprising:
a chassis assembly comprising a first metal and which is grounded;
a tray supporting an optical disc and slidably installed in the chassis assembly so as to slide in and out of the chassis assembly;
a cover-deck comprising a second metal and which is attached on a lower surface of the tray;
an eject switch provided on a front surface of the tray and which unlocks the tray when the tray is locked in the chassis assembly;
an eject button provided in front of the tray to press the eject switch;
a bracket comprising a third metal, provided between the eject switch and the eject button, and having a lead formed at one end portion thereof and contacting the cover-deck; and
a static electricity discharge wire electrically connecting the cover-deck and the chassis assembly,
wherein static electricity generated when the eject button is pressed sequentially flows through the bracket, the cover-deck, the chassis assembly, and flows out to a ground.

2. The optical disc drive as claimed in claim 1, wherein the bracket has an opening disposed at a central portion of a front surface of the eject switch and a flange portion protruding forward around an edge of the opening toward the eject button.

3. The optical disc drive as claimed in claim 1, wherein the bracket is attached to the front surface of the tray.

4. The optical disc drive as claimed in claim 1, wherein the cover-deck and a lead at one end portion of the static electricity discharge wire are coupled using a bolt so as to be conductively connected.

5. The optical disc drive as claimed in claim 1, wherein the chassis assembly and a lead at the other end portion of the static electricity discharge wire are coupled using a bolt so as to be conductively connected.

6. The optical disc drive as claimed in claim 1, wherein the static electricity discharge wire comprises a predetermined circuit pattern formed in a flexible printed circuit.

7. The optical disc drive as claimed in claim 2, wherein the bracket is comprised of a main portion and the flange portion and the flange portion is substantially orthogonal to the main portion of the bracket and protrudes forward more than the eject switch such that the flange portion is closer to the eject button than the eject switch, thereby inducing static electricity from the eject button.

8. A disc drive for recording onto and/or reproducing information from a disc comprising:

a chassis assembly;

a tray supporting the disc and slidably installed in the chassis assembly to slide in and out of the chassis assembly;

an eject switch provided on a surface of the tray to unlock the tray when the tray is locked in the chassis assembly;

a cover-deck which is attached on another surface of the tray;

a bracket disposed at the eject switch and contacting the cover-deck; and a static electricity discharge wire connecting the cover-deck and the chassis assembly so as to form an electrical pathway between the chassis assembly and the bracket via the cover-deck.

9. The disc drive as claimed in claim 8, further comprises a spacer formed of an insulating member positioned between the eject switch and the bracket.

10. The disc drive as claimed in claim 8, wherein the static electricity discharge wire comprises an insulation coated copper wire.

11. The disc drive as claimed in claim 8, wherein the static electricity discharge wire comprises a flexible printed circuit.

12. The disc drive as claimed in claim 8, further comprising a lead positioned between at an end portion of the bracket and the cover-deck.

13. The disc drive as claimed in claim 8, wherein the cover-deck and a lead at one end portion of the static electricity discharge wire are coupled using a bolt so as to be conductively connected.

14. The disc drive as claimed in claim 8, wherein the chassis assembly and a lead at the other end portion of the static electricity discharge wire are coupled using a bolt so as to be conductively connected.

15. The optical disc drive as claimed in claim 8, wherein the bracket is comprised of a main portion and a flange portion and the flange portion is substantially orthogonal to the main portion of the bracket and protrudes forward more than the eject switch such that the flange portion is closer to the eject button than the eject switch, thereby inducing static electricity from the eject button.

16. The disc drive as claimed in claim 8, wherein the another surface of the tray is a lower surface of the tray.

17. A disc drive having an eject switch to unlock a tray for recording onto and/or reproducing information from a disc comprising:

a chassis assembly;

the tray supporting the disc and slidably installed to slide in and out of the chassis assembly;

a cover-deck attached on a lower surface of the tray; and a bracket disposed at the eject switch, the bracket having a lead formed at one end portion thereof;

wherein the cover-deck and bracket are contacted by the lead regardless of the tray position to transmit static electricity from the bracket to the chassis assembly via the cover-deck.

18. The optical disc drive as claimed in claim 17, wherein the bracket is comprised of a main portion and a flange portion and the flange portion is substantially orthogonal to the main portion of the bracket and protrudes forward more than the eject switch such that the flange portion is closer to the eject button than the eject switch, thereby inducing static electricity from the eject button.

* * * * *